Patented Oct. 19, 1926.

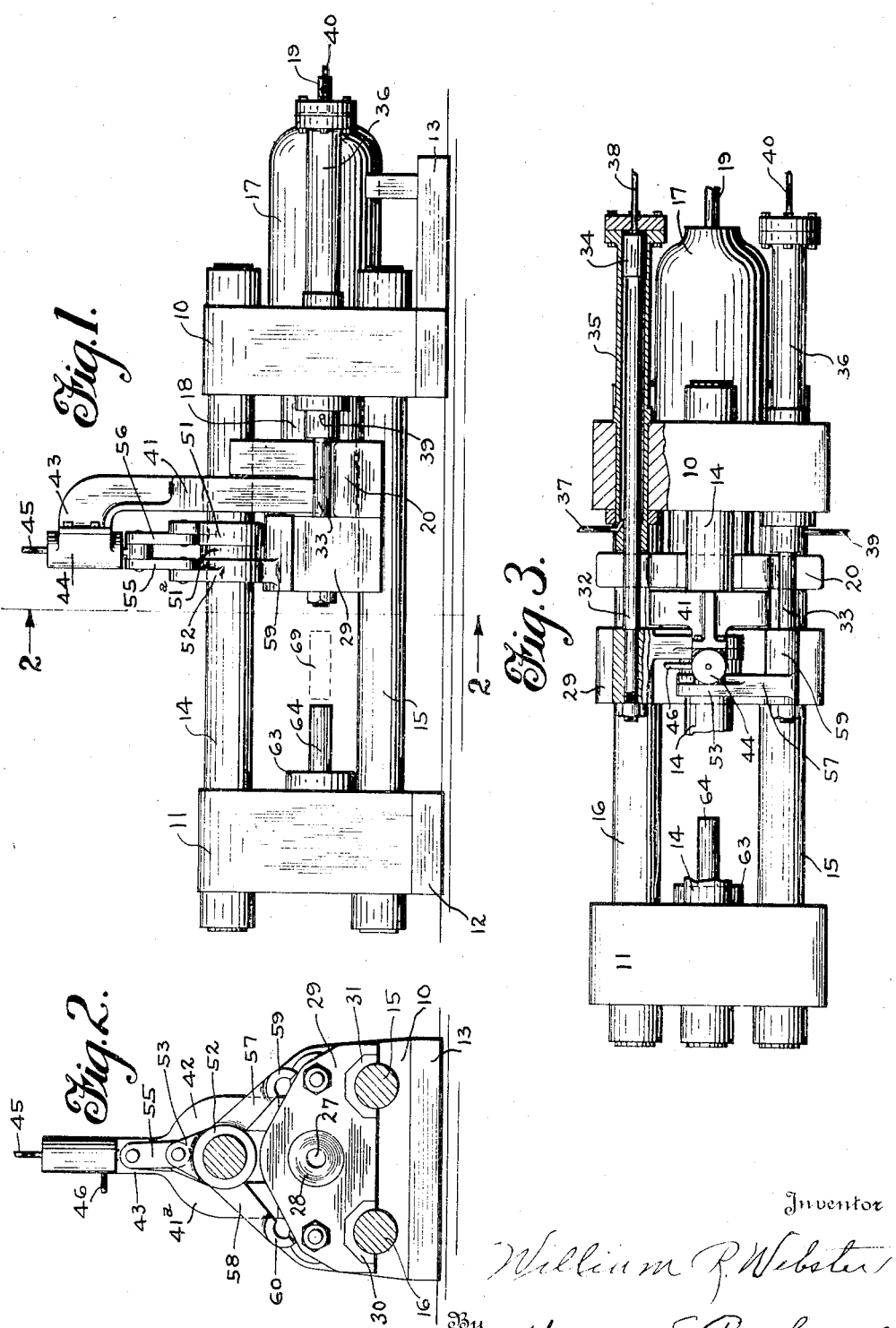

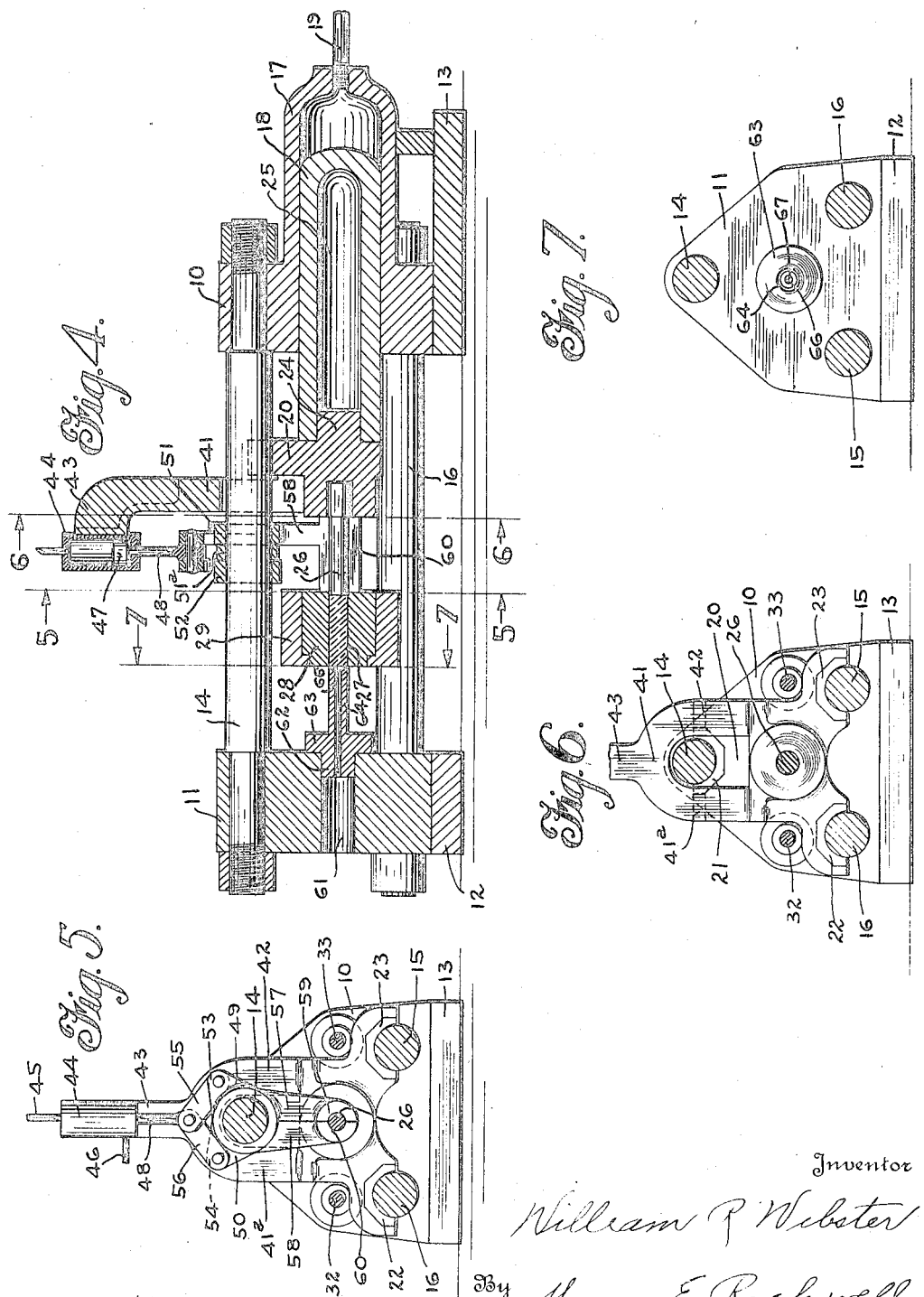

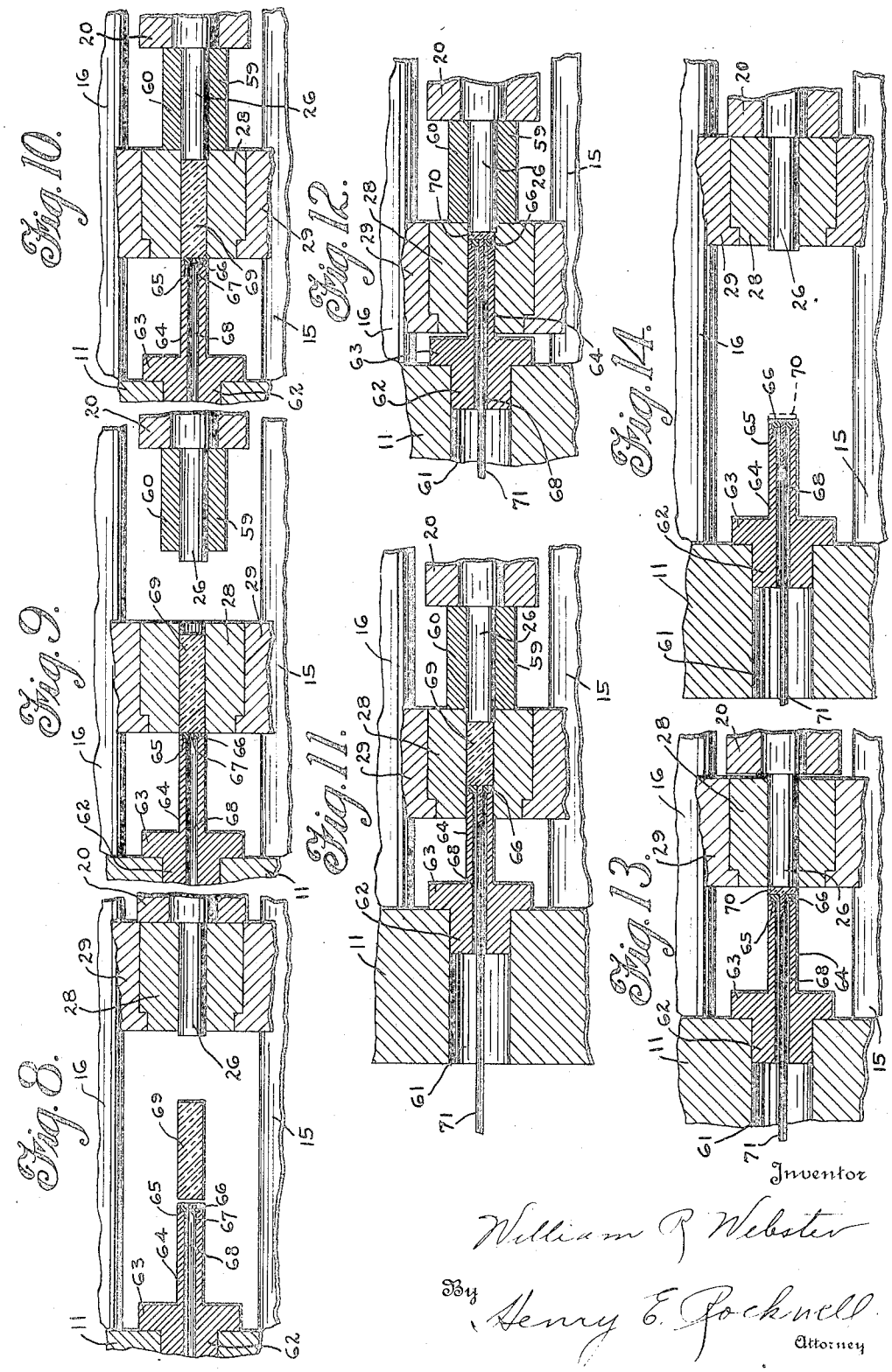

1,603,435

UNITED STATES PATENT OFFICE.

WILLIAM R. WEBSTER, OF BRIDGEPORT, CONNECTICUT.

METHOD OF AND MEANS FOR EXTRUDING BRASS AND LIKE METAL.

Application filed October 19, 1921. Serial No. 508,669.

This invention relates to the extrusion of metal and, more particularly, to an extrusion process in which a heated metal billet is placed in a suitable container or receiver and extruded therefrom through a die.

It is common practice in the extrusion of the metal to accomplish the extrusion process by means of a machine provided with a movable extrusion ram which enters one end of the billet container and is moved therethrough to extrude the metal through the other end. The die is placed against the end of the container through which the metal is extruded, and is held thereagainst by a suitable die backing, the die and container normally being held in a stationary position while the movable ram is forced through the container to extrude the metal through the die. It will thus be apparent that in this process a relative motion is brought about between the die and container on the one hand and the movable ram on the other, the two former elements normally remaining fixed while the latter is moved.

It is found that when a brass billet is extruded by the process outlined above, or processes similar thereto, the last portion of the rod (assuming that a rod is being extruded through the die) to leave the die contains a characteristic defect which is practically always present. This defect is normally present in perhaps the last twenty-five or thirty per cent of the extruded rod so that a considerable loss is entailed, as this portion of the rod is not usable, and, as stated above, comprises one-quarter or more of the extruded length. This defect appears as a flow or "pipe" in the inner part of the extruded product, consisting of oxide of the metal and foreign matter distributed in the general form of a tube approximately coaxial with the rod.

The occurrence of this defect is thought to be due to the fact that when the heated billet is placed in the relatively cool container and expanded into close contact with the walls thereof by the first movement of the ram, the outer surface is chilled and becomes less plastic than the interior. On continued movement of the ram, the plastic interior flows readily through the die, but the outer less plastic skin flows less readily and is probably held to some extent in the container by friction with the wall of the container bore. Consequently, this outer skin which must shorten as the billet becomes smaller folds up, advances toward the axis of the billet and is carried forward and inward by the flow of metal toward the die. It thus causes a defect in the extruded rod and as it does not reach the die until the last twenty-five or thirty per cent of the rod is extruded, the defect is not found except in this portion.

One object of my invention is to overcome the disadvantages above referred to and to provide a new process of extruding metal such that the extruded work will not contain the defects which are present in metal extruded by the processes now in use.

Another object of my invention is to provide a new and improved process of extruding a metal billet such that practically the entire billet may be extruded without the formation of any defects in the extruded work.

Another object of my invention is to provide a new and improved process of extruding metal wherein the die is moved relatively to the billet container, and relative motion between the billet and billet container is avoided.

A still further object of my invention is to provide a new and improved extrusion machine for carrying out the above mentioned process. More specifically, the machine contemplated by the present invention comprises means for producing relative movement between the die and billet container, while the billet is held against movement therein.

To these and other ends the invention consists in the novel features and combination of parts to be hereinafter described and claimed.

In the accompanying drawings:

Fig. 1 is a side elevation of a machine for carrying out my improved process, the parts being in position to receive a billet to be extruded;

Fig. 2 is a transverse sectional view on line 2—2 of Fig. 1;

Fig. 3 is a top plan view of the machine shown in Fig. 1, certain parts being shown in section;

Fig. 4 is a longitudinal sectional view of the machine, the parts being shown in position to commence the extrusion of the billet;

Fig. 5 is a transverse sectional view on line 5—5 of Fig. 4;

Fig. 6 is a transverse sectional view on line 6—6 of Fig. 4;

Fig. 7 is a transverse sectional view on line 7—7 of Fig. 4; and

Figs. 8 to 14 are detail longitudinal, horizontal, sectional views showing different stages of the extrusion operation.

As has been stated above, the present processes for extruding brass and similar metals are very wasteful as the scrapping of a quarter or more of the extruded work is unavoidable on account of the defects appearing therein. As a result of attempts to prevent this waste, I have discovered that when relative movement of the billet container and billet is avoided, practically the entire billet may be extruded without any defect appearing in the extruded work, a very short stump remaining which contains practically all of the defective part of the billet. This small remaining stump or stub contains the crumpled chilled exterior surface of the billet referred to above which, when the extrusion is carried out by my method, is not forced into the extruded work. It will be apparent that a great saving is thereby achieved.

The machine which I have selected to illustrate the carrying out of my improved method comprises end frames 10 and 11 which may be supported upon suitable base blocks 12 and 13, and connected by tie rods 14, 15 and 16, three in number, as shown. The frame 10 is provided with a fluid cylinder 17, in which is mounted a piston 18 designed to furnish the power for the extrusion operation. The pressure fluid may be admitted to the cylinder 17 through the pipe 19.

To the forward end of the piston 18 is secured a crosshead or carriage 20 provided with bearings 21, 22 and 23, adapted to engage and slidably mount the carriage upon the tie rods 14, 15 and 16. As shown, the carriage is provided with a reduced projecting portion 24 at its rear side designed to enter the bore 25 of the piston to suitably connect the two for movement together. At the front of the crosshead is mounted a plunger or ram 26 adapted to enter the receiving bore 27 of the billet container 28. This ram or plunger is preferably slightly greater in length than the receiving bore 27 so that after the extrusion process has been completed, the remaining stump or sprue may be expelled by relative movement of the plunger and container.

The billet container 28 is carried by and mounted within a movable carriage 29 which is slidably mounted upon the two lower tie rods 15 and 16 by means of bearings 30 and 31. To the carriage 29 are connected a pair of rods 32 and 33, these rods being continuations of two pistons 34 mounted in cylinders 35 and 36 carried by the frame 10 upon opposite sides of the cylinder 17. The cylinders 35 and 36 are provided with fluid supply pipes 37, 38, 39 and 40 for admitting fluid pressure upon either side of the pistons 34 in order to drive the pistons in opposite directions. It will be apparent that by proper control of the fluid pressure through these pipes, the pistons, together with the container carriage and container, may be moved in either direction along the tie rods 15 and 16.

Upon the carriage 20 is mounted a frame or standard 41 consisting of a pair of spaced legs 41ª and 42 extending upwardly upon either side of the tie rod 14 and converging to form an arm 43 upon which is mounted a vertically disposed cylinder 44, having pressure supply pipes 45 and 46 to admit fluid pressure upon either side of a piston 47. To the piston 47 is connected a rod 48 extending downwardly toward the tie rod 14. A pair of bell crank levers 49 and 50 are mounted upon the tie rod 14 by the provision of collars 51 and 52 surrounding this rod, the upper arms 53 and 54 of these levers being connected to the rod 48 for operation thereby by a pair of toggle links 55 and 56 pivoted to the rod at their upper ends and to the arms 53 and 54 at their lower ends. A spacing collar 51ª may be mounted on the tie rod 14 between the collars 51 and 52, if desired. The other arms 57 and 58 of the bell crank levers project downwardly from the tie rod 14 and carry upon their lower ends a pair of cooperating semi-cylindrical spacing jaws 59 and 60 which cooperate, when in operative position, to form a cylindrical spacing collar about the plunger 26. Upon referring to Figs. 2 and 5 it will be apparent that when pressure is admitted below the piston 47 and the latter moved to the upper end of the cylinder 44, the toggle links 55 and 56 will assume a vertical position, as shown in Fig. 2, and spread the spacing jaws 59 and 60 as shown in that figure. On the other hand, when pressure is admitted above the piston 47 and the latter forced downwardly, the toggle members will be urged toward a horizontal position and the spacing jaws will be moved to embrace the plunger 26.

In the end frame 11 is provided a longitudinally disposed opening or bore 61 which receives a reduced rearwardly projecting cylindrical portion 62 of a ram carrying head 63 carrying upon its opposite side a ram 64. Upon the end of the ram is provided a die seat 65 in which is mounted a die 66 having a bore 67, through which the metal billet is adapted to be extruded. The ram and ram carrying block are provided with a bore 68 through which the extruded work may pass.

The operation of my machine is as follows. Assuming that the parts are in the position shown in Figs. 1 and 8, the billet container and plunger 26, both being in their extreme right hand positions as viewed in these figures, a billet 69 is placed opposite the container bore 27. Fluid pressure is then admitted through pipes 38 and 40 to move the billet container to the left so that the billet may be received in the bore thereof as shown in Fig. 9. By the admission of fluid pressure through the pipe 45, the spacing jaws 59 and 60 are then brought down to embrace the plunger 26 as shown in this figure. Fluid pressure is then admitted to the cylinder 17 and the carriage 20 is moved to the left, carrying with it the plunger 26 and the frame 41, together with the spacing jaws 59 and 60. As shown in Fig. 10, the spacing jaws are of such a length that a small portion of the end of the plunger 26 is received in the container bore 28, thus effectually sealing up the rear end of this bore. With the parts in this position, the extrusion of the metal is now begun. This operation is carried out by the continued admission of fluid pressure to the cylinder 17, moving the piston and carriage 20 further toward the left, these parts now pushing before them, by means of the spacing jaws 59 and 60, the container 28 and carriage 29. The ram 64 is of such a size that it will enter the container bore 27, and as the container is moved toward the left with one end of the container bore sealed by the plunger 26, the die carrying ram enters the bore at the other end, and the billet is extruded through the opening in the die and the hollow die carrying ram, as shown in Fig. 11. The movement is continued until practically the entire billet has been extruded as shown in Fig. 12, a small stump 70 remaining, the extruded portion of the work 71 passing out through the bore 68 of the die carrying ram and the bore 61 of the end frame 11. The spacing jaws 59 and 60 are now moved upwardly into inoperative position and the container 28 moved toward the right, as shown in Fig. 13, by means of fluid pressure being admitted to the cylinders 35 and 36 through the pipes 37 and 39. The plunger 26 remaining stationary during this part of the operation, the stump 70 is expelled from the container.

The motion of the container is now continued to the right by means of the pistons 34 and rods 32 and 33, the container carrying with it the plunger 26 and crosshead 20 to the extreme right hand position shown in Fig. 14. The stump 70 is now severed from the extruded rod immediately adjacent the face of the die and the parts are in position to receive another billet 69, as shown in Fig. 8.

It will be apparent from the foregoing description that after the billet is placed within the container, as shown in Fig. 9, all relative movement between the billet and the container is avoided, the container being moved, together with the billet and plunger 26, toward the extrusion ram 64. It will of course be obvious that the same result might be produced if the container and plunger were held in a stationary position and the die carrying ram advanced into the container. In either case the die would be moved relatively to the container and billet, thus securing a result markedly different from the prior processes which extrude the billet through stationary container and die.

I have found that in my improved process the external skin or chilled portion of the billet is retained adjacent the face of the plunger 26 and thus is not extruded through the die, but rather is found in the small, unextruded stump 70 remaining in the container. By my improved method, practically all of the metal billet may be extruded, only a small stump remaining to be scrapped, thus achieving a great saving over prior processes.

The improved result obtained by my method may be explained upon the following theory. When, in prior processes, the plunger moves the billet through the container, the surface portion thereof, becoming somewhat chilled, and therefore less plastic than the body of the billet, crumples up in front of the plunger ram and is carried inwardly and forwardly toward the axis of the billet and in the direction of the flow through the die. It thus becomes surrounded by the more plastic metal and is carried through the die with this more fluent portion. In my improved method, however, when the outer chilled surface of the billet meets the advancing ram it is turned inwardly toward the axis of the billet but rearwardly relatively to the flow through the die. This less plastic portion is therefore turned back before it reaches the "main current" and is pushed against the face of the die, where it remains until the metal is practically all extruded. Whatever the explanation, the fact that the results set forth above occur has been determined empirically.

While I have shown and described my improved method and machine as applied to the extrusion of brass rods, it will be apparent that I do not intend to limit myself to this particular use of my invention which may be varied in many details without departing from the spirit of the invention or from the scope of the appended claims. My improved method is, of course, equally applicable to the extrusion of copper alloys other than brass and other metals that are placed in suitable condition for extruding by the application of heat to the billet.

It will be obvious that my invention is not limited to a device employing a die seated in recess in the ram as a suitable die may merely be placed between the ram and the billet or a hollow ram alone may be used without the employment of a separate die, the die being constituted in effect by the end of the ram.

What I claim is:

1. An extrusion machine including a billet container having a bore therethrough, a tightly fitting die cooperating therewith, and a plunger to hold a billet within the container while producing relative movement between the container and die to thrust the die substantially through the container bore to extrude the billet.

2. An extrusion machine including a billet container having a billet receiving bore, a plunger adapted to enter and close one end of the bore, a tightly fitting die adapted to enter the opposite end of the bore, and means for thrusting the die through the container bore, while preserving the relative positions of the container and plunger.

3. An extrusion machine including a billet container having a billet receiving bore, a solid plunger adapted to close one end of the bore, an extrusion ram, a tightly fitting die carried thereby, and means to perform the entire extrusion operation by movement of the die and ram through the container bore while a billet is held therein by the plunger.

4. An extrusion machine including a billet container having a billet receiving bore, a plunger adapted to close one end of the bore, a hollow extrusion ram, a rod forming die carried thereby and means to extrude substantially an entire billet through said die and ram while maintaining the relative positions of the plunger and container.

5. In an extruding machine, a container having a billet receiving bore, a plunger adapted to enter and close one end of the bore, an extrusion ram adapted to enter the other end of the bore, and having a die upon the end thereof with a central rod forming opening, and means for producing relative motion between the ram and plunger to extrude the billet through the die while maintaining the container and plunger against relative movement.

6. In an extruding machine, a container having a billet receiving bore, a plunger adapted to enter one end of the bore, an extrusion ram adapted to enter the other end of the bore, a die carried by said ram, means for producing relative motion between said ram and plunger, while preserving the relative positions of the billet and container and means for moving the container relatively to the plunger to expel the unextruded stump.

7. In an extrusion machine, a billet container, and means for holding a billet therein, in combination with a hollow extrusion ram through which the extruded work is adapted to pass, a die carried by said ram, means for inserting the ram in the container to extrude the billet, and means for inserting the holding means into the container to expel the stump.

8. An extrusion machine comprising an extrusion ram carrying a die, a billet container, an imperforate plunger insertable in the container bore to hold a billet therein, and means for advancing the billet container and plunger toward said ram to extrude a billet through the die.

9. An extrusion machine comprising a suitably supported die, a billet container having a bore open at both ends, a plunger insertable into the bore to close one end of the same to hold a billet therein, and means to insert the die substantially entirely through the container bore to extrude the billet through the die.

10. An extrusion machine comprising a suitably supported die, a billet container and a plunger cooperating therewith, means to advance said container and plunger as a unit toward said die to extrude the billet therethrough and means to permit the container to move away from the die relatively to the plunger.

11. A device for extruding metal billets, including a billet container having a billet receiving bore, a plunger adapted to be inserted in said bore, and means movably mounted relatively to the plunger to limit the insertion of the plunger in the bore.

12. A rod extruding machine including a billet container, a solid plunger, a suitably supported die tightly fitting the container bore, means to advance said plunger a sufficient distance toward said container to close the bore thereof and to thereafter advance said plunger and container as a unit toward the die.

13. An extruding machine, including a billet container, a plunger cooperating therewith, a member carrying said plunger and means interposed between said container and said plunger to limit the advancing movement of the plunger toward the container.

14. An extruding machine, including a billet container, a plunger cooperating therewith, a member carrying said plunger, and movable means adapted to be interposed between said container and plunger to limit the relative approaching movement of the plunger and container.

15. An extruding machine, including a billet container, a plunger cooperating therewith, a member carrying said plunger, movably mounted means adapted to be interposed between said plunger and container to limit the relative approaching movement of these members, and means to withdraw said movably mounted means from operative position.

16. An extruding machine, including a billet container, a plunger cooperating therewith, a member carrying said plunger, and means adapted to be interposed between said container and said plunger to limit the relative approaching movement of these members, said means including a pair of cooperating spacing members positioned upon either side of said plunger.

17. An extruding machine, including a billet container, a plunger cooperating therewith, a member carrying said plunger, and means adapted to be interposed between said container and said plunger carrying member, to limit the relative approaching movement of these members, said means including a pair of pivotally mounted spacing members adapted to be swung into and out of operative position.

18. An extruding machine, including a billet container, a plunger cooperating therewith, a member carrying said plunger, and means adapted to be interposed between said container and said plunger carrying member to limit the relative approaching movement of these members, said means including a pair of pivotally mounted spacing members and means for swinging said members in position to embrace the plunger between said container and plunger carrying member.

19. An extruding machine, including a billet container, a plunger cooperating therewith, a member carrying said plunger, and means adapted to be interposed between said container and said plunger carrying member to limit the relative approaching movement of these members, said means including a pair of pivotally mounted arms, each carrying a spacing jaw upon one end thereof, and means to move said spacing jaws into a position embracing said plunger and plunger carrying member and to withdraw said jaws from this position.

20. An extruding machine, including a billet container, a plunger cooperating therewith, a suitably supported die through which the billet is adapted to be extruded, means for moving said plunger toward the container, and movably mounted means for causing the container to be moved with the plunger during at least a part of its movement.

21. An extruding machine, including a billet container having a bore therein, a plunger cooperating therewith, capable of being inserted through the container bore, a suitably supported die tightly fitting the container bore through which the billet is adapted to be extruded, means for moving said plunger in the direction of the container, and means for causing the container to be moved with the plunger during at least a part of its movement.

22. An extruding machine, including a billet container, a plunger cooperating therewith, a suitably supported die through which the billet is adapted to be extruded, means for moving said plunger toward the die, and spacing means abutting adjacent portions of the plunger and container to cause the container to be moved by the plunger.

23. An extruding machine, including a movably mounted billet container, a movably mounted plunger cooperating therewith and capable of being inserted therethrough, a member carrying said plunger, an extrusion ram, a die supported at one end thereof, means for producing relative movement between the extrusion ram on the one hand and the billet container and plunger on the other, while preventing relative movement of the container and plunger to insert the extrusion ram within the container bore.

24. An extruding machine, including a movably mounted billet container, a movably mounted plunger cooperating therewith, spacing means adapted to be interposed between a part of the plunger and the billet container to cause the plunger to move the container with it in one direction, means to withdraw said spacing means whereby the billet container may be moved relatively to the plunger to expel the stump, and means to move the billet container in a direction opposite to the first mentioned direction, said container moving the plunger therewith in said latter direction.

25. The method of extruding a heated metal billet which comprises inserting it in a bore in a suitable container, positioning a die tightly fitting the bore at one end of the billet and extruding it through the die while holding the billet against movement in the container by an imperforate plunger positioned at the other end of the bore.

26. The method of extruding a heated billet in the form of a rod which comprises inserting it in an open ended bore in a suitable container and closing one end of the bore so as to hold the billet against movement in one direction therein, while advancing, substantially entirely through the bore, a tightly fitting extrusion ram to extrude the billet therethrough.

27. The method of extruding a heated metal billet which comprises inserting it in a bore in a suitable container, positioning a plunger at one end of the bore to close the same and to hold the billet therein, and advancing a tightly fitting die substantially through the container bore at the other end thereof.

28. The method of extruding a heated metal billet which comprises inserting it in a bore in a suitable container, positioning a plunger at one end of the bore, positioning a die at the other end of said bore, producing a relative movement between the die on the one hand, and the container and plunger on the other to extrude the metal and then moving the container relatively to the die and plunger to expel the stump.

29. The method of extruding a heated metal billet which comprises inserting it in a bore in a suitable container, inserting a plunger a short distance into one end of the container bore, advancing a die into the other end of the container bore, while preventing relative movement between the plunger and container, and then moving the container away from the die and relatively to the plunger to expel the stump.

30. The method of extruding metal which consists in placing a metal billet in the bore of a container, positioning a plunger at one end of said bore, advancing said plunger and container toward a suitable die until the latter is forced into the billet and the metal extruded therethrough, and then moving the container relatively to the plunger to expel the unextruded stump.

31. The method of extruding metal which consists in placing a metal billet in a container, positioning a plunger at one end of the container, moving the plunger and container as a unit toward a die to extrude the billet therethrough by the insertion of the die within the container, then moving the container in the opposite direction and relatively to the plunger to drive the plunger through the container to expel the unextruded stump.

32. An extruding machine, including an extrusion ram, a die supported at one end thereof, a billet container, a plunger cooperating therewith, means to position said plunger in the end of said container bore to hold a billet therein, means to move said plunger and container toward the extrusion ram to insert the ram in the container, and means to thereafter move said container relatively to said ram and plunger to expel the unextruded stump by the insertion of the plunger in the container.

33. The method of extruding a heated metal billet, which comprises placing such billet in a container and extruding it in rod form through a die while retaining the skin portion of the billet in the container.

34. The method of extruding a heated copper-alloy billet in the form of a rod substantially devoid of "pipe," which comprises placing such billet in a container and extruding it through an orifice having movement relatively to the container while retaining the skin portion of the billet in the container.

35. The method of extruding a heated copper-alloy billet to form a rod, which comprises placing the hot billet in a container and extruding it by forcing into the billet a hollow ram tightly fitting the container bore, and then moving the container away from the ram to expel the unextruded stump.

36. The method of extruding a billet of heated plastic metal, which comprises placing the billet within a suitable container and extruding substantially all of the more plastic portion thereof through a die opening while retaining the chilled surface portion of the billet within the container.

37. The method of extruding a heated copper-alloy billet, which comprises placing the hot billet in a container and forcing a tightly fitting hollow ram into the container and billet for extruding the latter through the ram while retaining the skin portion of the billet within the container.

38. The method of extruding heated metal, which comprises placing a hot billet in a container and extruding it through a die while preventing relative movement between the container and billet and then moving the container away from the unextruded stump to strip the latter.

39. The method of extruding a heated metal billet, which comprises placing the billet in a suitable container and extruding substantially all of the more plastic portion thereof through a suitable die while retaining the surface metal of the billet within the container.

40. The method of extruding a brass rod of substantially uniform grain, which comprises heating a brass billet and extruding therefrom substantially the whole interior plastic portion thereof while retaining the skin.

41. The method of extruding a brass rod of uniform grain, which comprises heating a brass billet and extruding therefrom substantially more than seventy-five per cent of the mass without extruding the skin.

42. The method of extruding heated metal, which comprises placing a hot billet in a suitable container and extruding the more plastic portion thereof through a die, while folding up the less plastic surface portion adjacent the die face.

43. The method of extruding heated metal, which comprises placing a hot billet in a suitable container and extruding the more plastic portion thereof through a die, while turning back the less plastic surface thereof in a direction opposite the flow of metal through the die.

44. In an extruding machine, a container having a billet receiving bore, a plunger adapted to enter and close one end of the bore, a ram adapted to enter the other end of the bore and being provided with a central rod forming opening, and means for producing relative movement between the ram and plunger while holding the plunger against movement relatively to the container.

In witness whereof, I have hereunto set my hand on the 15th day of October, 1921.

WILLIAM R. WEBSTER.